(12) United States Patent
Machida

(10) Patent No.: US 8,223,407 B1
(45) Date of Patent: *Jul. 17, 2012

(54) SHEET MEDIA STACK IMAGING SYSTEM

(75) Inventor: Akihiro Machida, Sunnyvale, CA (US)

(73) Assignee: Marvell International Technology Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,011

(22) Filed: Sep. 2, 2011

Related U.S. Application Data

(63) Continuation of application No. 11/356,633, filed on Feb. 17, 2006, now Pat. No. 8,014,047.

(51) Int. Cl.
*H04N 1/04* (2006.01)

(52) U.S. Cl. ........ 358/474; 358/475; 358/509; 358/497; 399/23; 399/389; 271/145

(58) Field of Classification Search .................. 358/474, 358/486, 497, 496, 498, 475, 509; 399/23, 399/13, 389; 271/145, 171, 162
See application file for complete search history.

(56) References Cited

U.S. PATENT DOCUMENTS

| | | | |
|---|---|---|---|
| 3,565,421 A | 2/1971 | Barker et al. | |
| 5,053,814 A * | 10/1991 | Takano et al. | 399/23 |
| 5,428,557 A | 6/1995 | Harbaugh et al. | |
| 5,610,720 A | 3/1997 | Fujioka et al. | |
| 5,678,127 A | 10/1997 | Suga | |
| 5,790,099 A | 8/1998 | Okada | |
| 6,002,906 A | 12/1999 | Hino et al. | |
| 6,070,023 A | 5/2000 | Kataoka | |
| 6,100,993 A * | 8/2000 | Eom | 358/1.14 |
| 6,176,480 B1 * | 1/2001 | Yonenuma et al. | 270/58.08 |
| 6,302,393 B1 * | 10/2001 | Beskitt et al. | 271/258.01 |
| 6,331,000 B1 * | 12/2001 | Beskitt et al. | 271/3.01 |
| 6,385,406 B1 | 5/2002 | Funamizu et al. | |
| 6,583,891 B2 * | 6/2003 | Joyce | 358/1.18 |
| 6,585,344 B2 * | 7/2003 | Kolodziej | 347/19 |
| 6,599,041 B1 | 7/2003 | Ahne et al. | |
| 6,636,704 B2 | 10/2003 | Weaver et al. | |
| 6,823,148 B2 * | 11/2004 | Weaver et al. | 399/23 |
| 6,929,417 B2 * | 8/2005 | Boudreau | 400/703 |
| 7,387,059 B2 * | 6/2008 | Kobayashi | 83/684 |
| 7,445,209 B2 | 11/2008 | Sano et al. | |
| 7,490,828 B2 * | 2/2009 | Machida et al. | 271/145 |
| 7,544,266 B2 | 6/2009 | Herring et al. | |
| 7,789,232 B2 * | 9/2010 | Suito et al. | 206/449 |
| 8,014,047 B2 * | 9/2011 | Machida | 358/498 |
| 2002/0079640 A1 | 6/2002 | Yoshie et al. | |
| 2003/0223780 A1 | 12/2003 | Kobayashi | |
| 2004/0036681 A1 | 2/2004 | Kluttz et al. | |
| 2005/0115377 A1 * | 6/2005 | Kobayashi | 83/684 |
| 2007/0085263 A1 | 4/2007 | Machida et al. | |

* cited by examiner

*Primary Examiner* — Negussie Worku

(57) ABSTRACT

An imaging system that includes a sheet media stack over a recording unit. Image data is generated in response to radiation received from a field of view encompassing sheet media edges of individual media within the sheet media stack. Edges of individual media are detected within the image data.

20 Claims, 5 Drawing Sheets

SHEET MEDIA STACK IMAGING SYSTEM

CROSS REFERENCE TO RELATED APPLICATIONS

This present disclosure is a continuation of U.S. application Ser. No. 11/356,633, filed on Feb. 17, 2006. The contents of which is hereby incorporated by reference in its entirety.

The present application contains subject matter related to U.S. application Ser. No. 11/252,085 (now U.S. Pat. No. 7,490,828), filed on Oct. 17, 2005. The subject matter thereof is hereby incorporated herein by reference thereto.

BACKGROUND ART

The present invention relates generally to an imaging system, and more particularly to a sheet media stack imaging system.

Drawings, marks, words, pictures, sketches, diagrams, and the like are formed every day around the world by humans to communicate ideas, and even though we live in a technically advanced computer savvy society, pen to paper is the oldest and most natural solution for capturing this information quickly. Unfortunately, notations on paper are not readily converted to digital format and normally require a time consuming scanning operation.

Digital notepads are one way of seamlessly integrating paper notations into a digital format. A digital notepad, also known as a digitizer pad, is a computer-input device, which captures graphical user inputs, including handwriting, impressed upon a surface of a pad and converts that user input into a digital representation thereof.

A typical digital notepad may include paper overlying a pressure sensitive element and a pen-like writing stylus. The stylus or special pen includes both an ink system for writing on the paper and an electronic circuit for interacting with the electronic pressure sensitive elements located within the pad. Digital notepads are used in computer aided drafting (CAD) applications, to record signature images in electronic commerce, and in certain biometrics applications.

Unfortunately, current digital notepad technology does not possess page-to-page correlation capability. Consequently, a user needs to manually define what page they are working on by striking a soft key on the digitizer pad surface or by pressing a button on the digital notepad. Without such manual operation by the user, subsequent writing formed after removal of a paper sheet will over scribble notations formed on the digitizer pad for the previous page.

Thus, a need still remains for a digital notepad with automatic page tracking capability that prevents overwriting notations formed on a previous page. In view of the ever-increasing need to save costs and improve efficiencies, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a sheet media stack over a recording unit. Image data is generated in response to radiation received from a field of view encompassing sheet media edges of individual media within the sheet media stack. Edges of individual media are detected within the image data.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
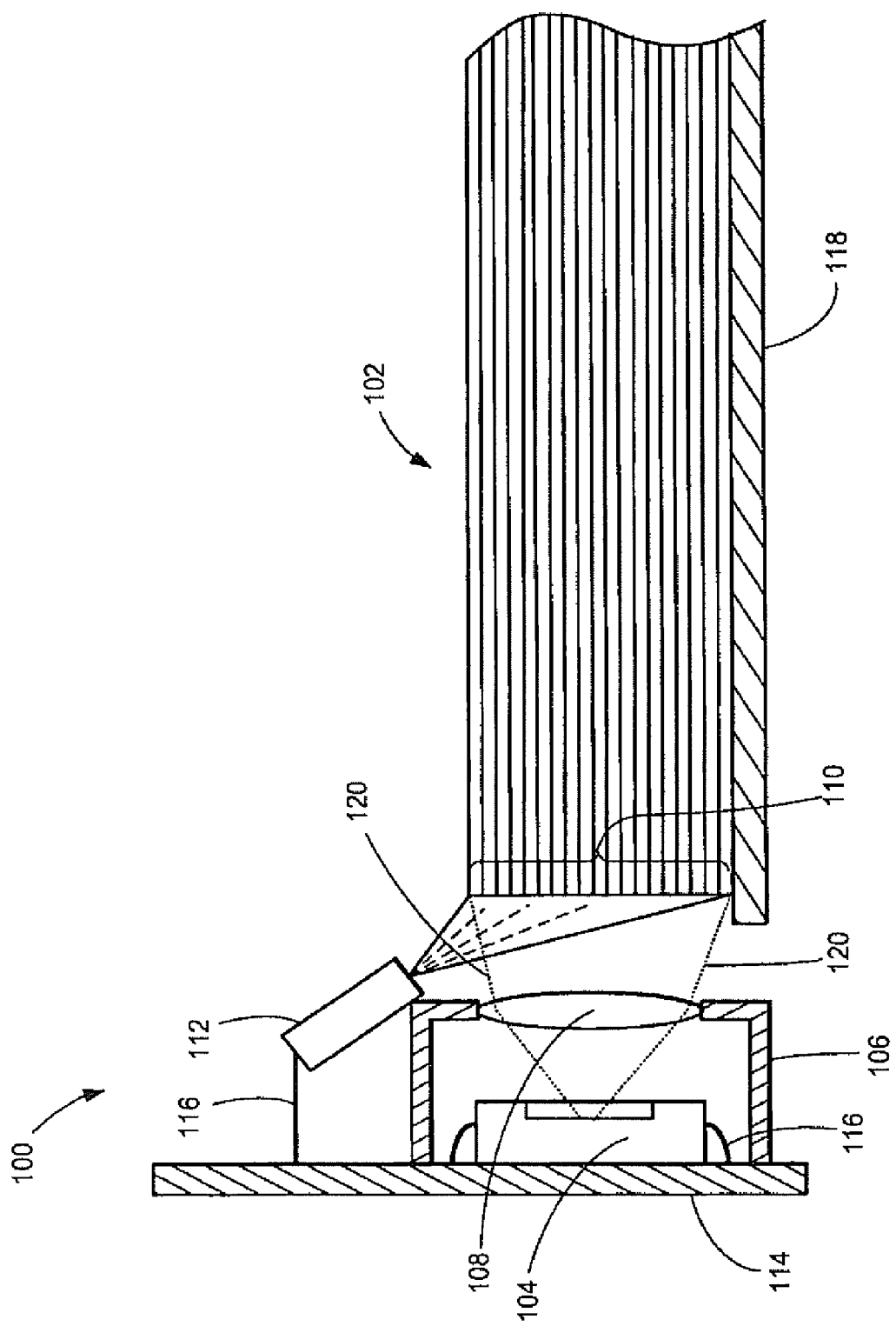
FIG. 1 is a sectional view of an imaging system including a portion of a sheet media stack in accordance with an embodiment of the present invention.

The following embodiments are described in sufficient detail to enable those skilled in the art to make and use the invention, and it is to be understood that other embodiments would be evident based on the present disclosure and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system configurations, and process steps are not disclosed in detail. Likewise, the drawings showing embodiments of the invention are semi-diagrammatic and not to scale and, particularly, some of the dimensions are for the clarity of presentation and are shown exaggerated in the drawing FIGs. In addition, where multiple embodiments are disclosed and described having some features in common, for clarity and ease of illustration, description, and comprehension thereof, similar and like features one to another will ordinarily be described with like reference numerals.

The term "horizontal" as used herein is defined as a plane parallel to the plane or surface of a digital notepad, regardless of its orientation. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane.

Referring now to FIG. 1 therein is shown a sectional view of an imaging system 100 including a portion of a sheet media stack 102 in accordance with an embodiment of the present invention. In this embodiment, an image sensor 104, such as a sheet media sensor, is incorporated in a housing 106 of the imaging system 100. The image sensor 104 contains logic circuitry for performing complex computations. The housing 106 supports a lens 108, which directs radiation reflected from sheet media edges 110 to an active area of the image sensor 104. The image sensor 104 and a radiation source 112 are mounted on a substrate 114. In the illustrated embodiment, the substrate 114 is an interconnection substrate, such as a printed circuit board.

The sheet media stack 102 overlies a sheet media support 118 and may include paper media, such as a notepad bound together along one edge, possibly but not limited to the top edge, or plastic media, such as transparencies. The sheet media support 118, such as a recording unit, documents notations formed on the sheet media stack 102 either by a pressure sensitive mechanism or an electrically sensitive mechanism. By way of example and not by way of limitation, the sheet media support 118 may include a digital notepad, a capacitive system, an electromagnetic system, an ultrasonic system, an infrared system, a laser scan system, or an optical patterned paper system.

The image sensor 104 and the radiation source 112 are electrically connected to the substrate 114 by electrical conductors 116. The radiation source 112 illuminates the sheet media edges 110 and the reflected radiation passes through the lens 108 along an optical axis that intersects the sheet media stack 102 plane that is defined by the sheet media edges 110. By way of example, the radiation source 112 may illuminate the edges of the sheet media stack 102 in a vertical manner. However, in accordance with the scope of this invention, the radiation source 112 may illuminate the sheet media edges 110 from any angle, whether oblique or acute to the sheet stacking direction, which enhances the contrast between the edges of the sheet media stack 102.

The image sensor 104 generates image data in response to light received from a field of view 120 through the lens 108 that encompasses the sheet media edges 110 of ones of the sheet media stack 102. The image sensor 104 may be any type of sensor, including a charge coupled device (CCD) sensor or a complementary metal-oxide-semiconductor (CMOS) sensor. The lens 108 may include one or more lenses that focus radiation that is reflected from the edges of the sheet media stack 102 onto the image sensor 104. The edges of the sheet media stack 102 may be illuminated by ambient light or by the radiation source 112 (e.g., a light emitting diode or a laser diode).

The field of view 120 of the image sensor 104 may encompass any number of sheet media that is desired by the user. In some implementations, the field of view 120 extends vertically from the bottom sheet level up to a view level that is at least as high as the specified maximum sheet media capacity level of the imaging system 100. In other implementations, the field of view 120 extends vertically from the bottom sheet level up to any view level that is lower than the specified maximum sheet media capacity level of the imaging system 100. The field of view 120 of the image sensor 104 is currently only limited by the technology of image sensing equipment.

As an exemplary illustration, the field of view 120 of the image sensor 104 may accommodate an engineering pad of paper with 60 micrometer sheet thickness and 200 sheets. Thus, the image sensor 104 having the field of view 120 that is 12 millimeters or larger is enough to image such a media stack. Ideally, the image sensor 104 should devote at least 5 pixels for imaging each sheet, therefore, almost any high volume low cost 1.3M pixel commercial image sensor with 1280×1024 resolution can image such a media stack.

The logic circuitry located within the image sensor 104 detects edges of individual ones of the sheet media in the image data that is generated by the image sensor. The logic circuitry may be implemented by one or more discrete modules that are not limited to any particular hardware or software configuration and may be implemented in any computing or processing environment, including in digital electronic circuitry (e.g., application specific integrated circuits) or in computer hardware, firmware, device driver, or software.

The logic circuitry may detect the edges of the sheet media in the image data in any of a wide variety of different ways. In some embodiments, the logic circuitry averages the image data corresponding to pixels of the image sensor 104 that are parallel to the edges of the sheet media (i.e. —orthogonal to the sheet stacking direction). The logic circuitry filters the averaged image data through a low-pass filter to reduce noise. The logic circuitry then applies a threshold to the filtered image data to detect peaks in the filtered image data.

Figure 2:
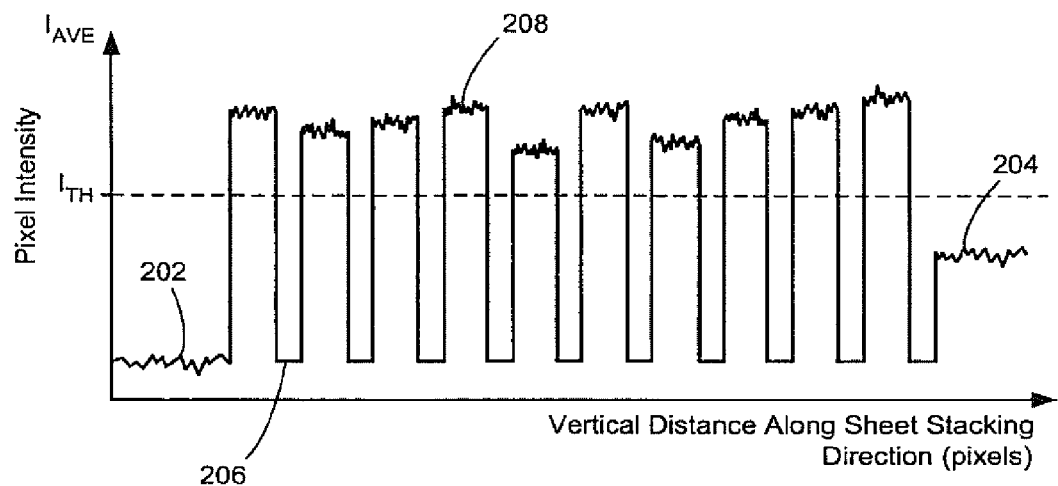
FIG. 2 is an exemplary graph of pixel intensity values of image data in accordance with an embodiment of the present invention.

Referring now to FIG. 2, therein is shown an exemplary graph of pixel intensity values ($I_{ave}$) of image data in accordance with an embodiment of the present invention. The image data represented in FIG. 2 has been low-pass filtered and averaged in the direction orthogonal to the sheet stacking direction. The filtered and averaged pixel values are plotted as a function of vertical distance along the sheet stacking direction from the bottom of the field of view 120, which typically corresponds to the top surface of the sheet media support 118. The exemplary threshold ($I_{th}$) is selected to distinguish the pixel values corresponding to the edges of the sheet media from the pixel values generated from light received from below the stack (e.g., area 202), pixel values generated from light received from above the stack (e.g., area 204), and pixel values generated from light received from between the sheets (e.g., depression 206).

In general, the logic circuitry may perform a wide variety of status monitoring functions based on the detected edges of the sheet media in the image data.

For example, in some embodiments, the logic circuitry counts the number of peaks 208 in the graph of the image data to determine the number of sheet media within the field of view 120. Yet still, in other embodiments, the logic circuitry may count the number of the peaks 208 in the graph of the image data, and subtracts this number from the original number/value of sheets when the user input began, thereby determining the number of media sheets used. By employing these methods, the present invention can automatically track the user media page number and prevent over scribble of a previous page when the user begins input on a new media page. Furthermore, the imaging system 100 displays automatic page tracking capability even when the user is flipping pages back-and-forth, as one might when jotting down notes.

Figure 3:
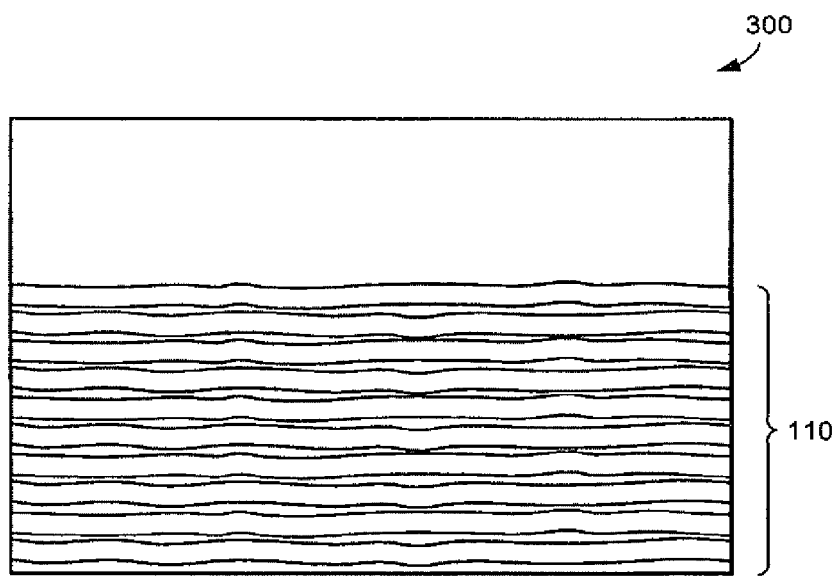
FIG. 3 is an image of the sheet media edges in accordance with an embodiment of the present invention.

Referring now to FIG. 3, therein is shown an image 300 of the sheet media edges 110 in accordance with an embodiment of the present invention. As seen from the image 300, ten (10) individual sheet media can be distinguished. This image data is then sent to the logic circuitry for additional filtering to enhance the contrast and count the exact number of sheet media over the sheet media support 118 (not shown).

Figure 4:
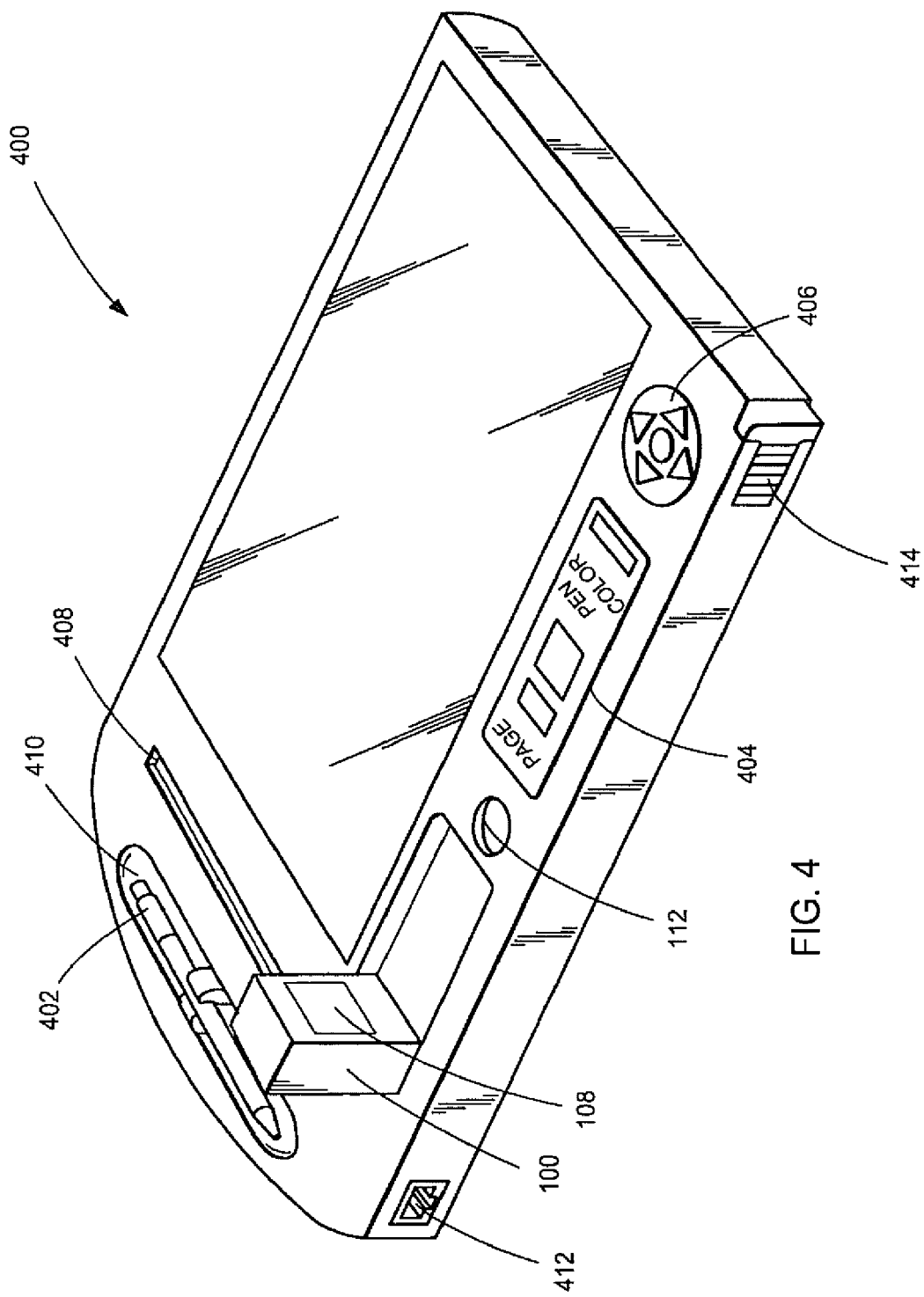
FIG. 4 is a digital notepad with an imaging system in accordance with an embodiment of the present invention.

Referring now to FIG. 4, therein is shown a digital notepad 400 with the imaging system 100 in accordance with an embodiment of the present invention. The digital notepad 400 includes the imaging system 100, the radiation source 112, a digital pen 402, a control panel 404, a menu selection key 406, an insert slot 408, a digital pen holder 410, a data input/output port 412, and a battery holder 414.

The digital notepad 400 is able to digitally capture writing/drawing strokes made by an associated stylus, such as the digital pen 402, at varying distances from the digital notepad 400 surface, which is the case as sheets of media are inked and removed from the digital notepad 400. The digital pen 402 may contain an electromagnetic transmitter, which is tracked by the digital notepad 400. The digital pen 402 may also be equipped with a pressure-sensitive mechanical sensor or other type of contact sensor, for detecting when the tip of the digital pen 402 is in contact with the sheets of media.

When the digital pen 402 is in contact with the sheets of media, a signal is transmitted from the digital pen 402 in any manner suitable to indicate its position of contact with the digital notepad 400. The digital notepad 400 in turn generates data indicating the position of the digital pen 402, and whether the tip of the digital pen 402 is in contact with the sheets of media.

While the digital notepad 400 is described with reference to an electromagnetic digitizer pad, it will be understood that the digital notepad 400 is not limited to that particular type, but may be any type of device having the ability to digitally capture writing/drawing strokes. For example, if the digital notepad 400 is responsive to pressure (resistivity), the pen need be no more than an ordinary passive pen or pencil. When the digital notepad 400 uses laser tracking, the digital pen 402 is provided with a suitable target material at the tip. Ultrasonic tracking may also be used. The digital pen 402 may also be equipped with a spatial sensing system using accelerometers to track the pen's position and an RF transmitter to communicate the position information in real time to a receiver in the digital notepad 400.

Also, as is known but not illustrated, the digital notepad 400 may have its own processor, memory and input/output (I/O) devices capable of implementing one or more of the operations described herein. It is to be understood that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device, flash memory, etc. In addition, the term "input/output devices" or "I/O devices" as used herein is intended to include, for example, one or more input devices, e.g., keyboard, pen or stylus, for entering data to the processing unit, and/or one or more output devices, e.g., CRT or other display, speaker and/or printer, for presenting results associated with the processing unit.

Additionally, it is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

The digital notepad 400 includes the imaging system 100, which can be recessed within the digital notepad 400 when not in use. The imaging system 100 includes the image sensor 104 (not shown), with its corresponding logic circuitry, and the lens 108 (not shown). As noted before, the imaging system 100 captures image data received from the edges of the individual sheet media located over the surface of the digital notepad 400. Additionally, when deployed or recessed, the imaging system 100 may act as a power ON/OFF switch for the digital notepad 400.

Although the imaging system 100 is depicted on one side of the digital notepad 400, it is not to be limited to such a position. The imaging system 100 may be located on any side of the digital notepad that facilitates the capturing of image data. Furthermore, the present invention includes the use of more than one of the imaging systems 100, wherein the image data received from each of the imaging systems 100 is correlated to produce a more accurate count of the sheet media located over the digital notepad 400.

The digital notepad 400 also includes the radiation source 112. As an exemplary illustration, the radiation source 112 may be recessed within the plane of the digital notepad and illuminate the edges of the sheets of media in a vertical direction. However, in accordance with the scope of this invention, the radiation source 112 may illuminate the edges of the sheets of media from any angle, whether oblique or acute to the sheet stacking direction, which enhances the contrast between the edges of the sheet media.

The digital notepad 400 also includes the control panel 404, which can display a plethora of user-defined options. For example, a user may view the current page number, pen color choice, date, time, and/or a preview of a digital note.

Additionally, the menu selection key 406 allows for navigation within the functions offered by the digital notepad 400. For example, the menu selection key 406 may contain a reset function or reset button option for when user input is complete. The reset function/button will allow the user to reset a counter within the logic circuitry to a current value equal to the number of media sheets located over the digital notepad 400 when the user input is complete for that job or task (i.e. —the original value). By resetting the counter to the original value, the imaging system 100 can count the number of sheets used in the next job or task and automatically advance the digital notepad 400 to the next page when a page is removed from the media stack.

The menu selection key 406 may also permit a user to designate the type of interface option for the digital notepad 400. For example, the digital notepad 400 may interface with other systems by a uniform serial bus (USB) connection, a wireless fidelity connection, an infrared connection or a Bluetooth™ connection.

The digital notepad 400 also contains an insert slot 408. As an exemplary illustration, the insert slot 408 can be designed for receiving the cardboard backing of a paper pad, such as an engineering pad; however, it is not to be limited to such a use. In accordance with the invention, the insert slot 408 may accommodate any structure used for support by the media stack, or any structure that helps to secure the media stack to the digital notepad 400, thereby preventing slippage of the media stack during user input.

Additionally, as is known within the art, the digital notepad 400 includes the data input/output port 412. The data input/output port 412 may accommodate any data transmission process, such as but not limited to, serial, USB or infrared.

Figure 5:
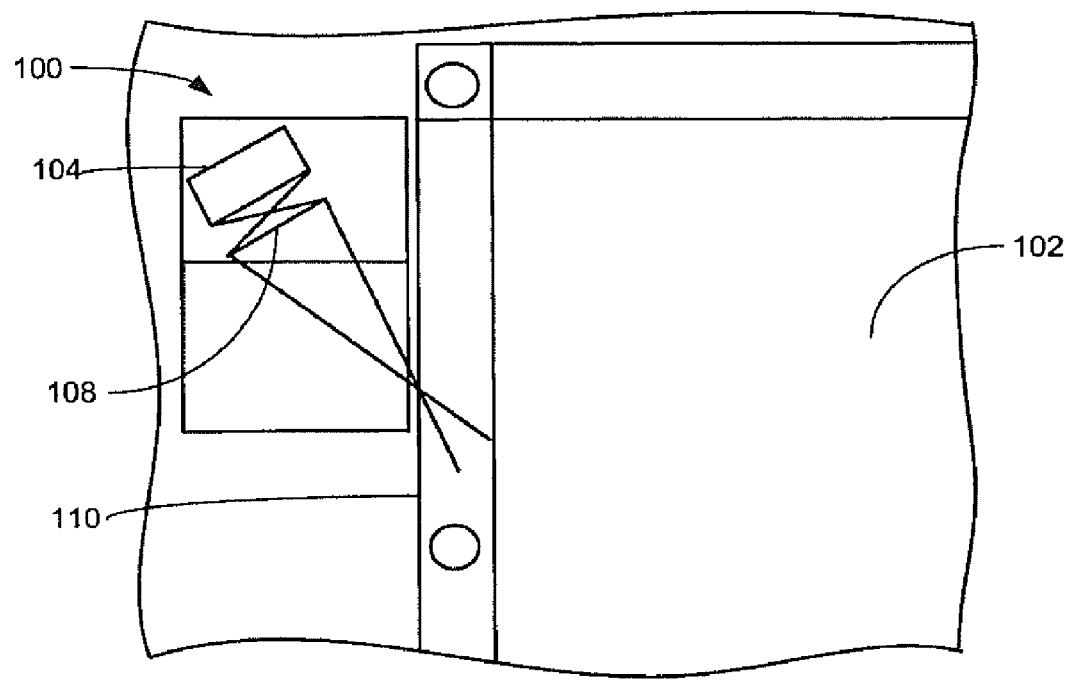
FIG. 5 is a top view of the imaging system with a top portion removed for purposes of clarity in accordance with an embodiment of the present invention.

Referring now to FIG. 5, therein is shown a top view of the imaging system 100 with a top portion removed for purposes of clarity in accordance with an embodiment of the present invention. The imaging system 100, which houses the image sensor 104 and the lens 108, is square in shape, and consequently, the image sensor 104 and the lens 108 must be positioned accordingly to view the sheet media stack 102. The image sensor 104 and the lens 108 may be positioned to view the sheet media stack 102 at any angle that produces optimal image data. By aligning the image sensor 104 and the lens 108 at an angle to the plane of the sheet media edges 110, the depth of focus can be increased and the clarity of the image data can be enhanced.

Figure 6:
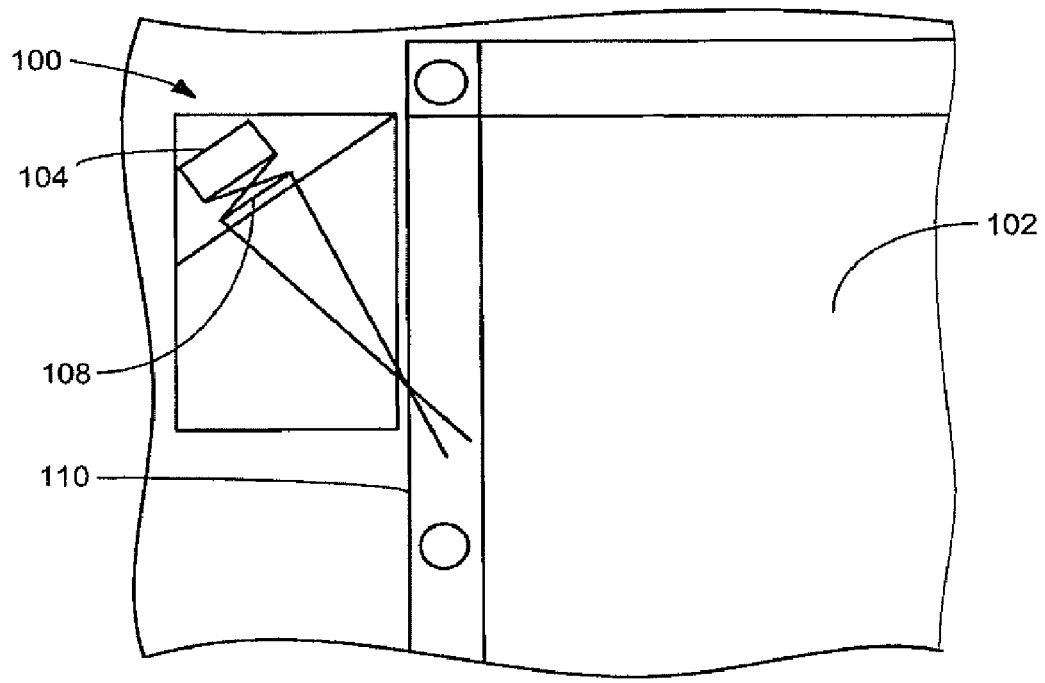
FIG. 6 is a top view of the imaging system with a top portion removed for purposes of clarity in accordance with another embodiment of the present invention.

Referring now to FIG. 6, therein is shown a top view of the imaging system 100 with a top portion removed for purposes of clarity in accordance with another embodiment of the present invention. The imaging system 100, which houses the image sensor 104 and the lens 108, is triangular in shape. Advantageously, the triangular housing structure can provide a larger area to view the sheet media edges 110. The image sensor 104 and the lens 108 may be positioned to view the sheet media stack 102 at any angle that produces optimal image data.

Figure 7:
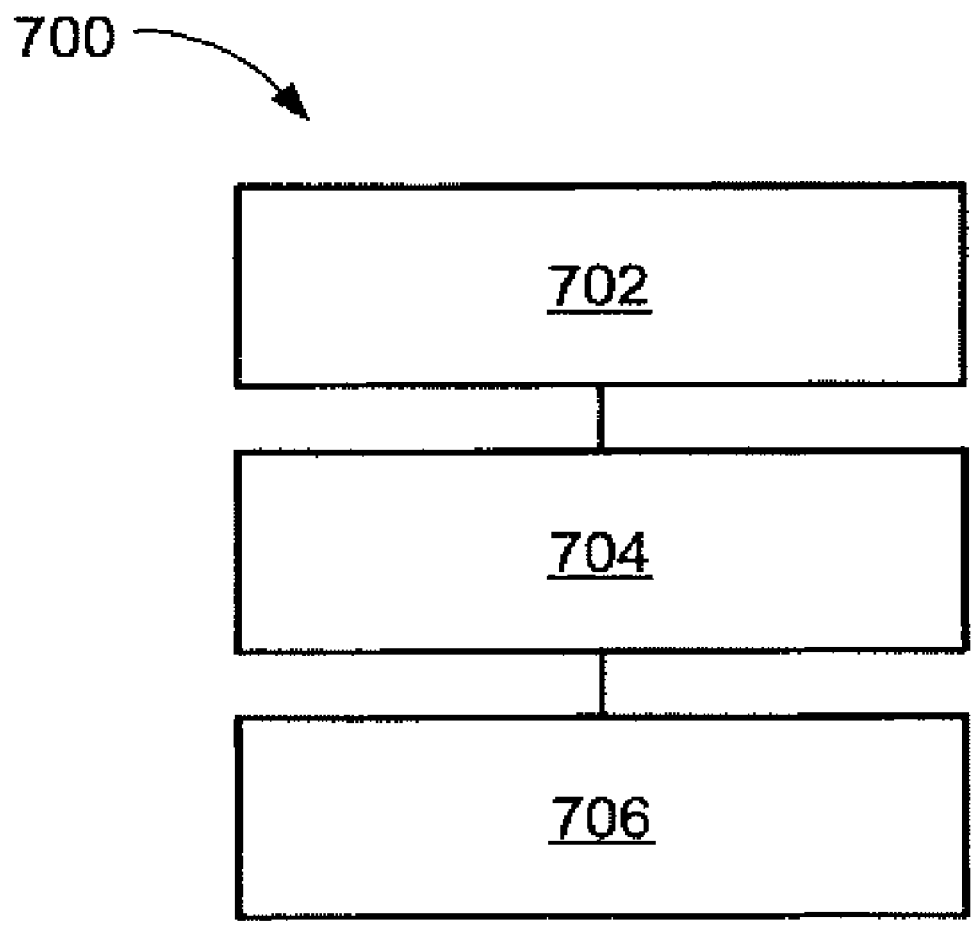
FIG. 7 is a flow chart for an imaging system for fabricating the imaging system in accordance with an embodiment of the present invention.

Referring now to FIG. 7, therein is shown a flow chart for an imaging system 700 for fabricating the imaging system 100 in accordance with an embodiment of the present invention. The imaging system 100 includes providing a sheet media stack over a recording unit in a block 702; generating image data in response to radiation received from a field of view encompassing sheet media edges of individual media within the sheet media stack in a block 704; and detecting edges of individual media within the image data in a block 706.

It has been discovered that the present invention thus has numerous advantages. A principle advantage is automatic page tracking capability for digital notepad technology that prevents overwriting notations formed on a previous page. This feature prevents loss of data from over scribbling, which can increase the productivity of a user.

Another advantage of the present invention is that a user no longer needs to manually input a page number change. This advantage offers ease of use, which can also increase the productivity of a user.

Yet still, another advantage of the present invention is that a user can readily flip back-and-forth between pages without fear of over writing a prior notation on a previous page. This advantage offers ease of use by preventing loss of an inventive concept due to time consuming steps, such as appropriate page number designation.

These and other valuable aspects of the present invention consequently further the state of the technology to at least the next level.

Thus, it has been discovered that the imaging system of the present invention furnishes important and heretofore unknown and unavailable solutions, capabilities, and functional advantages. For instance, the imaging system of the present invention permits automatic page tracking capability for digital notepad technology, which prevents overwriting notations formed on a previous page. The resulting processes and configurations are straightforward, cost-effective, uncomplicated, highly versatile and effective, can be implemented by adapting known technologies, and are thus readily suited for efficient and economical manufacturing.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters hithertofore set forth herein or shown in the accompanying drawings are to be interpreted in an illustrative and non-limiting sense.

The invention claimed is:

1. An imaging system comprising:
a sheet media stack disposed over a recording unit;
a radiation source configured to project radiation onto the sheet media stack; and
an imaging device that is stationary and fixed relative to the recording unit, the imaging device configured to receive a reflection of the radiation from at least a part of the sheet media stack and to determine, based on the reflection, at least one aspect of the sheet media stack.

2. The imaging system of claim 1, wherein the imaging device is configured to determine, based on the reflection, a number of sheets in the sheet media stack.

3. The imaging system of claim 1, wherein the imaging device comprises an image sensor configured to generate image data in response to the reflection.

4. The imaging system of claim 3, wherein the image sensor is selected from a group consisting of a charge coupled device sensor and a complementary metal-oxide semiconductor sensor.

5. The imaging system of claim 3, wherein the radiation source is configured to project the radiation onto a plurality of sheet media edges of the sheet media stack; and
wherein the imaging device further comprises at least one lens positioned along an optical path between the image sensor and the plurality of sheet media edges.

6. The imaging system of claim 3, wherein the radiation source is configured to project the radiation onto a plurality of sheet media edges of the sheet media stack; and
wherein the imaging device is configured to determine a number of sheets in the sheet media stack by detecting the plurality of sheet media edges in the image data.

7. The imaging system of claim 6, wherein the imaging device is configured to detect the plurality of sheet media edges in the image data by:
filtering the image data; and
applying a threshold to the filtered image data to detect peaks in the filtered image data.

8. The system of claim 1, wherein the recording unit comprises a digital notepad; and
wherein the system is configured to communicate with the digital notepad.

9. The system of claim 1, wherein the sheet media stack includes paper media or plastic media.

10. The system of claim 1, wherein the radiation source is configured to emit light.

11. The system of claim 10, wherein the radiation source includes a light emitting diode or a laser diode.

12. A method for imaging comprising:
using an radiation source to project radiation onto a sheet media stack disposed over a recording unit;
receiving a reflection of the radiation from at least a part of the sheet media stack using an imaging device that is stationary and fixed relative to the recording unit; and
determining, based on the reflection, at least one aspect of the sheet media stack.

13. The method of claim 12, wherein the at least one aspect of the sheet media stack is a number of sheets in the sheet media stack.

14. The method of claim 12, wherein the radiation is projected onto a plurality of sheet media edges of the sheet media stack.

15. The method of claim 14, further comprising:
generating image data in response to the reflection of the radiation.

16. The method of claim 15, wherein determining at least one aspect of the sheet media stack comprises:
detecting, within the image data, the plurality of sheet media edges of the sheet media stack.

17. The method of claim 15, wherein detecting the plurality of sheet media edges comprises:
filtering the image data; and
applying a threshold to the filtered image data to detect peaks in the filtered image data.

18. The method of claim 12, wherein the recording unit comprises a digital notepad; and
further comprising communicating with the digital notepad.

19. The method of claim 12, wherein the radiation source is configured to emit light.

20. The method of claim 19, wherein the radiation source includes a light emitting diode or a laser diode.

* * * * *